Aug. 6, 1968 R. E. HOPKINS 3,396,325
VOLTAGE CONTROL OF PERMANENT MAGNET GENERATORS
Filed July 21, 1965 7 Sheets-Sheet 1
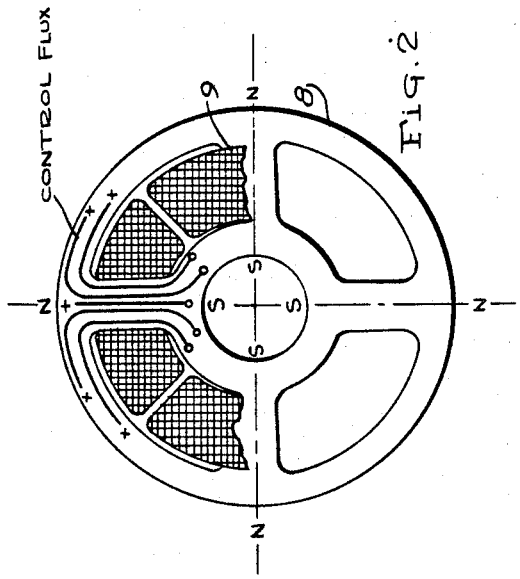
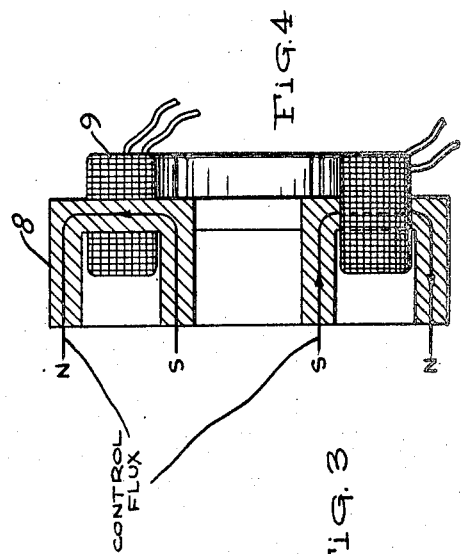
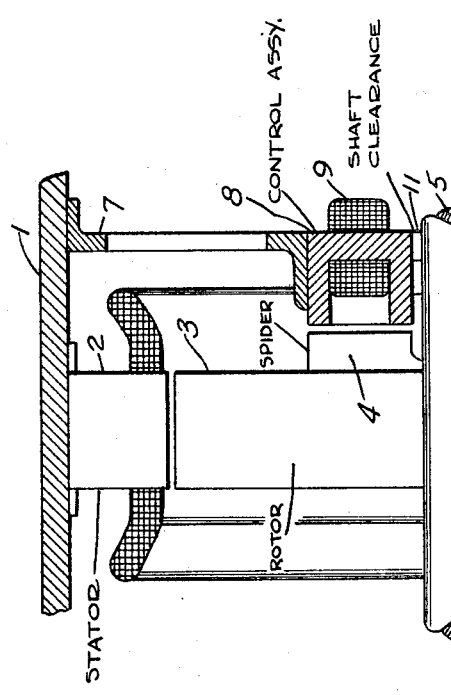
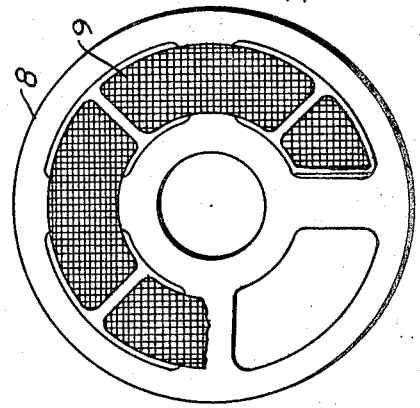
INVENTOR.
RALPH E. HOPKINS
BY
*George F. Westerman*
ATTORNEY

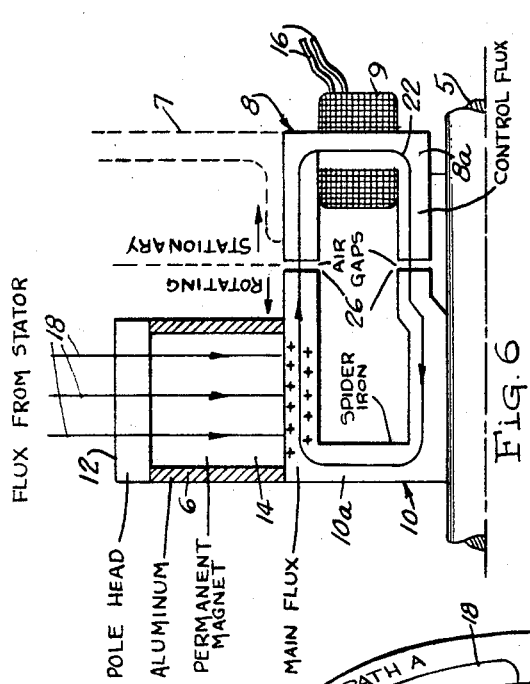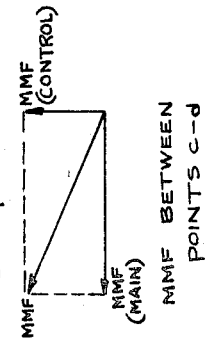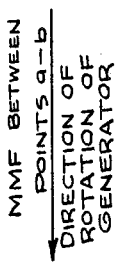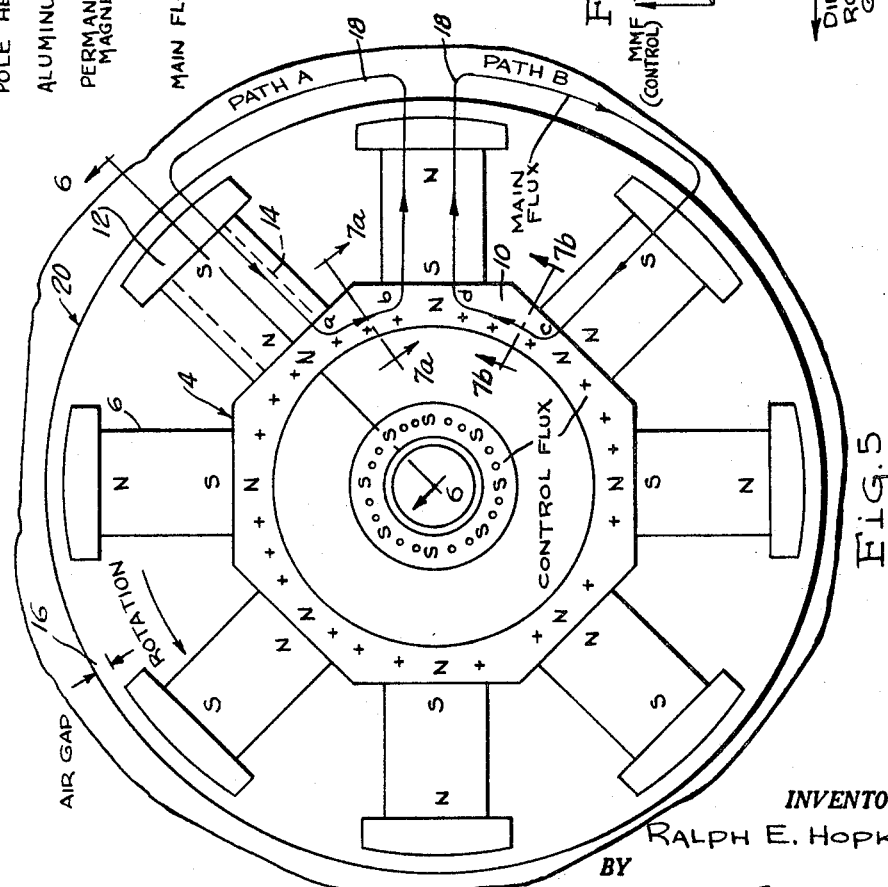

Aug. 6, 1968     R. E. HOPKINS     3,396,325
VOLTAGE CONTROL OF PERMANENT MAGNET GENERATORS
Filed July 21, 1965     7 Sheets-Sheet 3
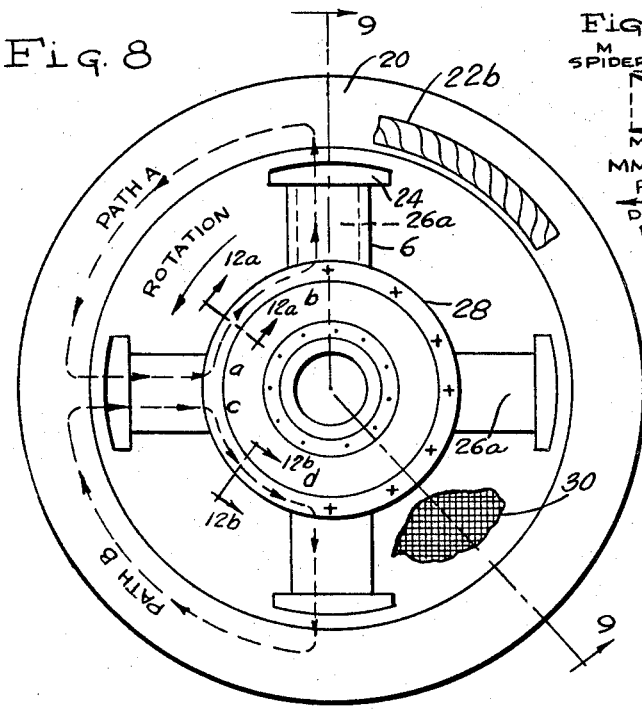
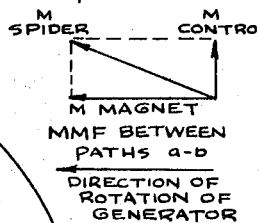
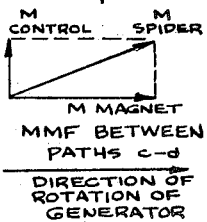
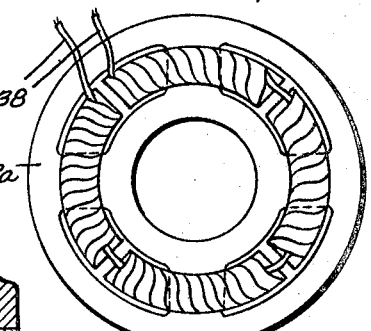
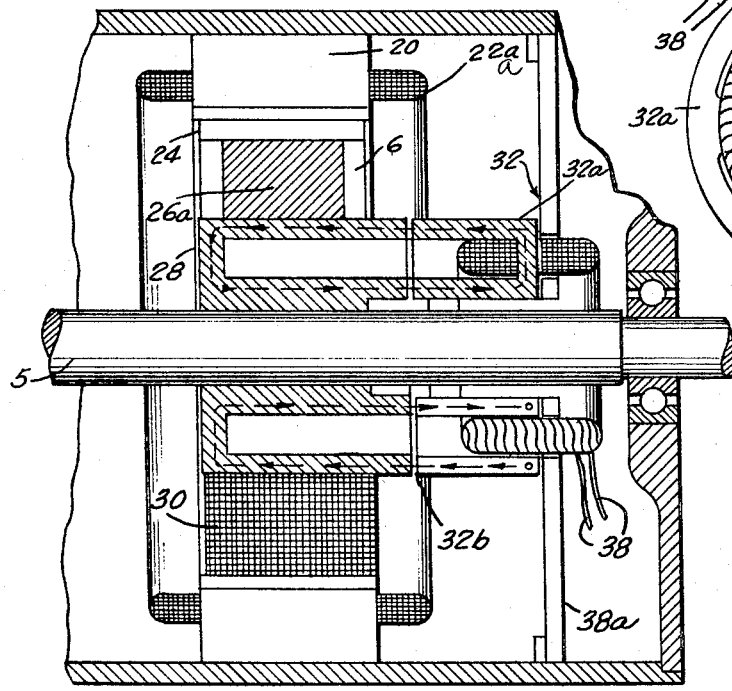
INVENTOR.
RALPH E. HOPKINS
BY
*George F. Westerman*
ATTORNEY

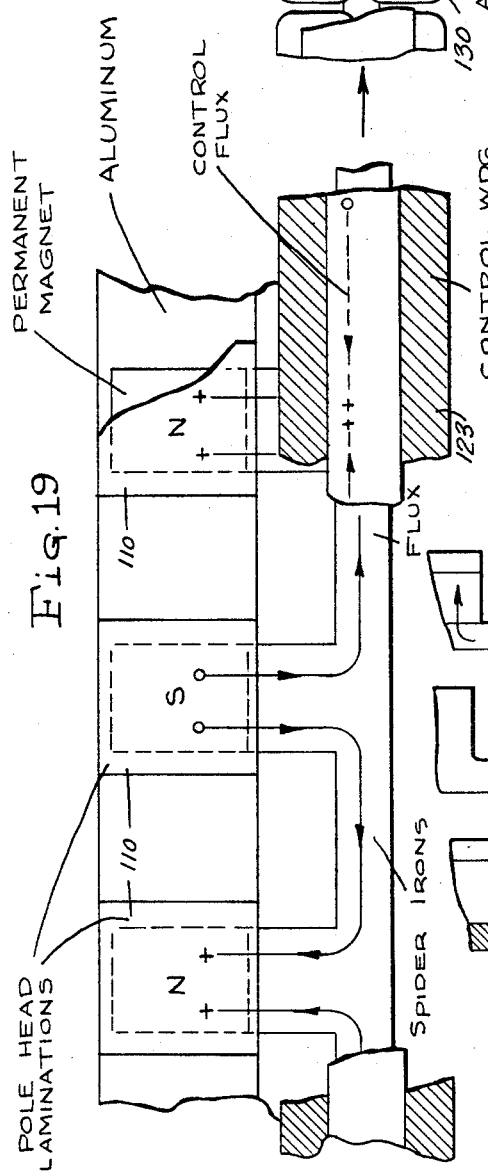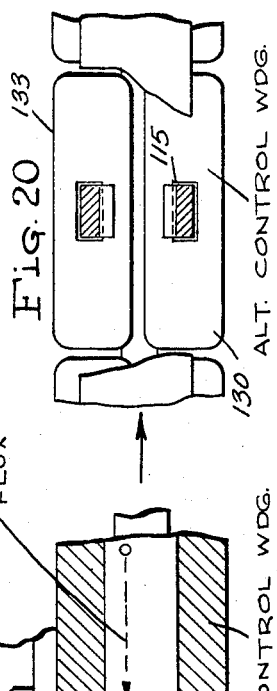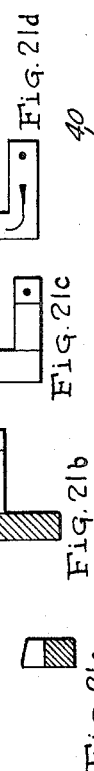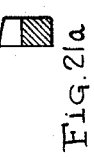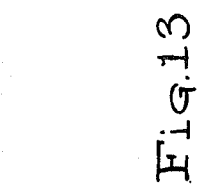

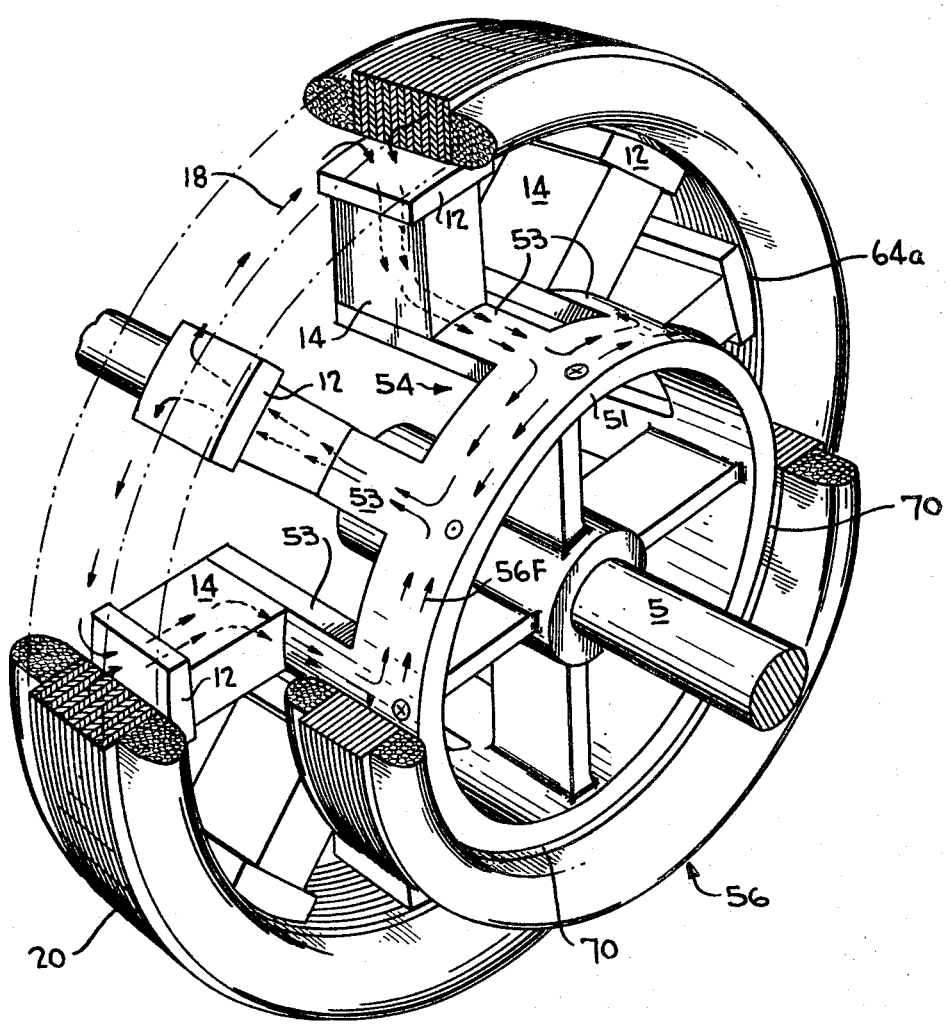

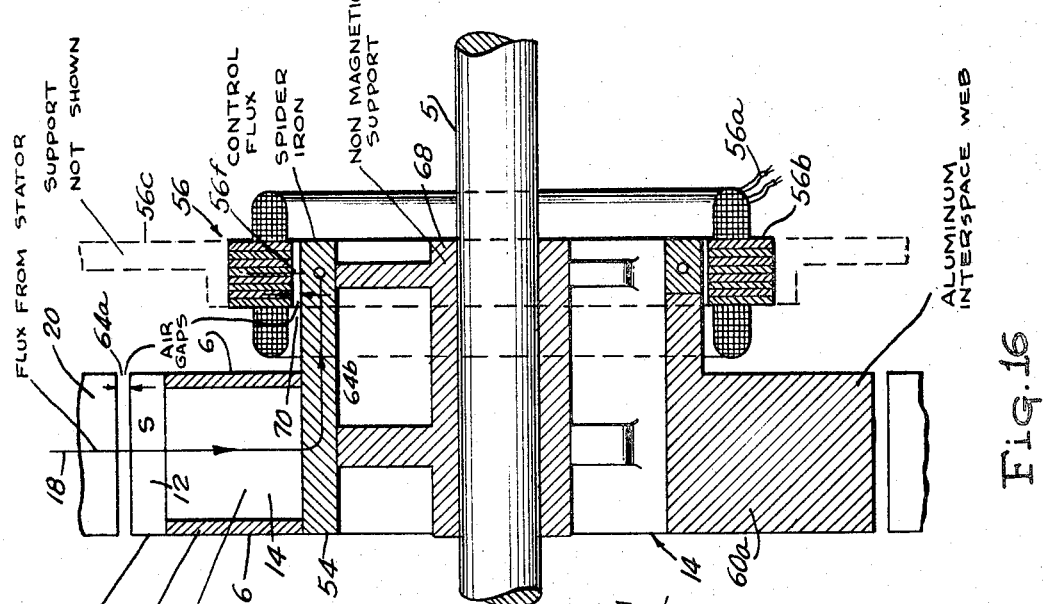
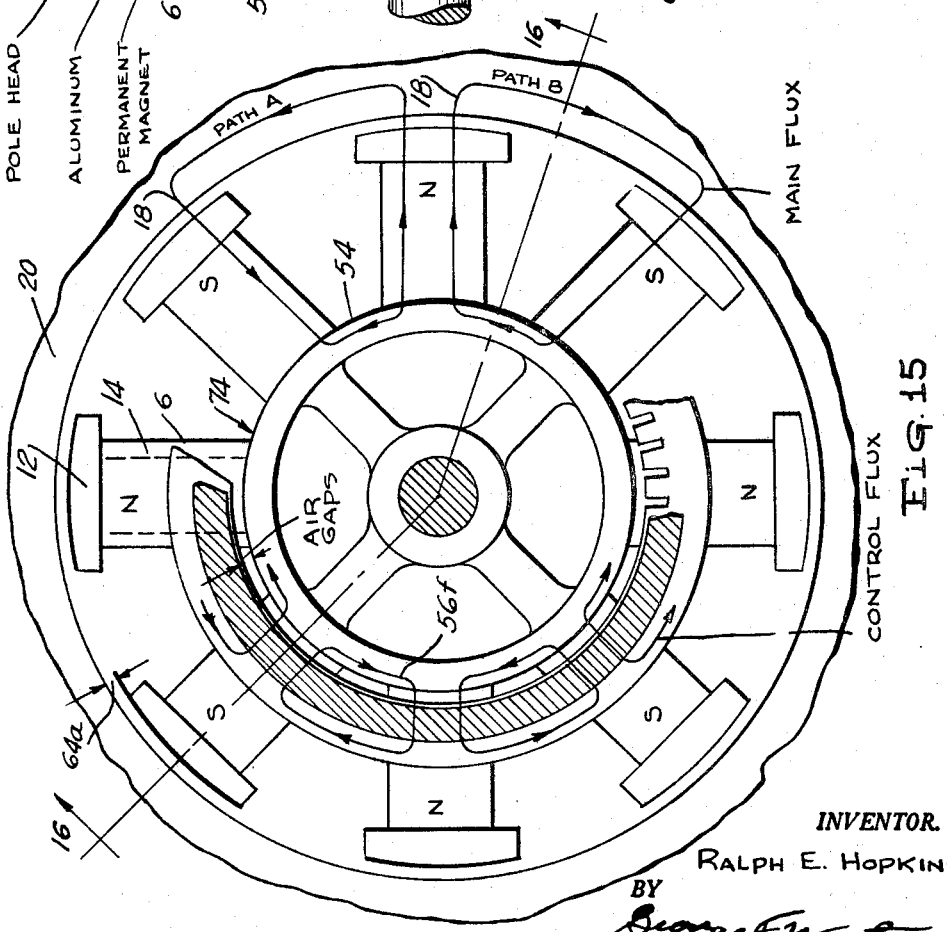

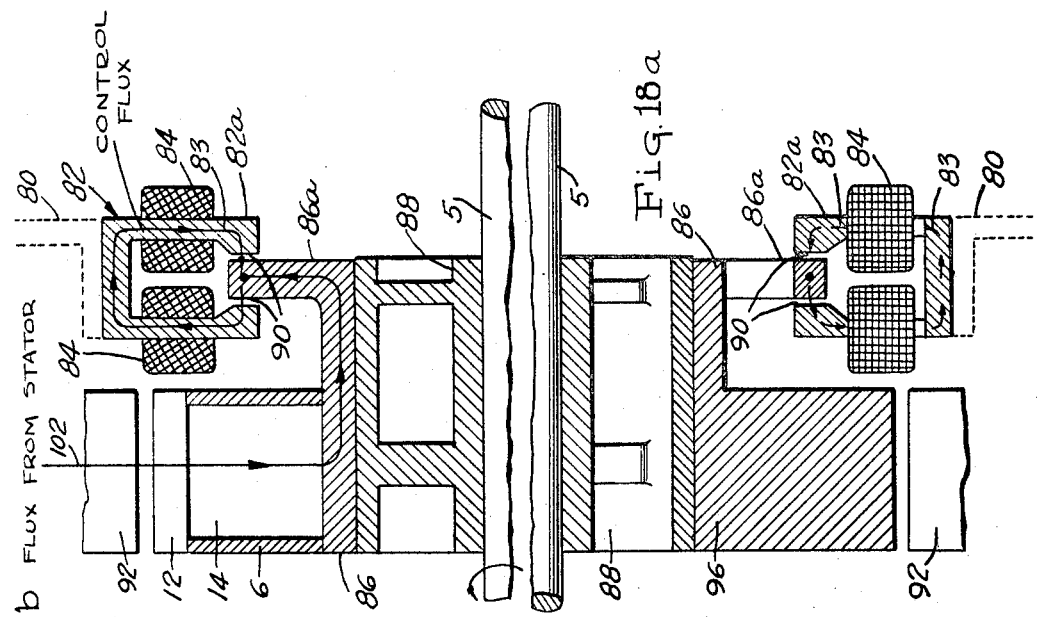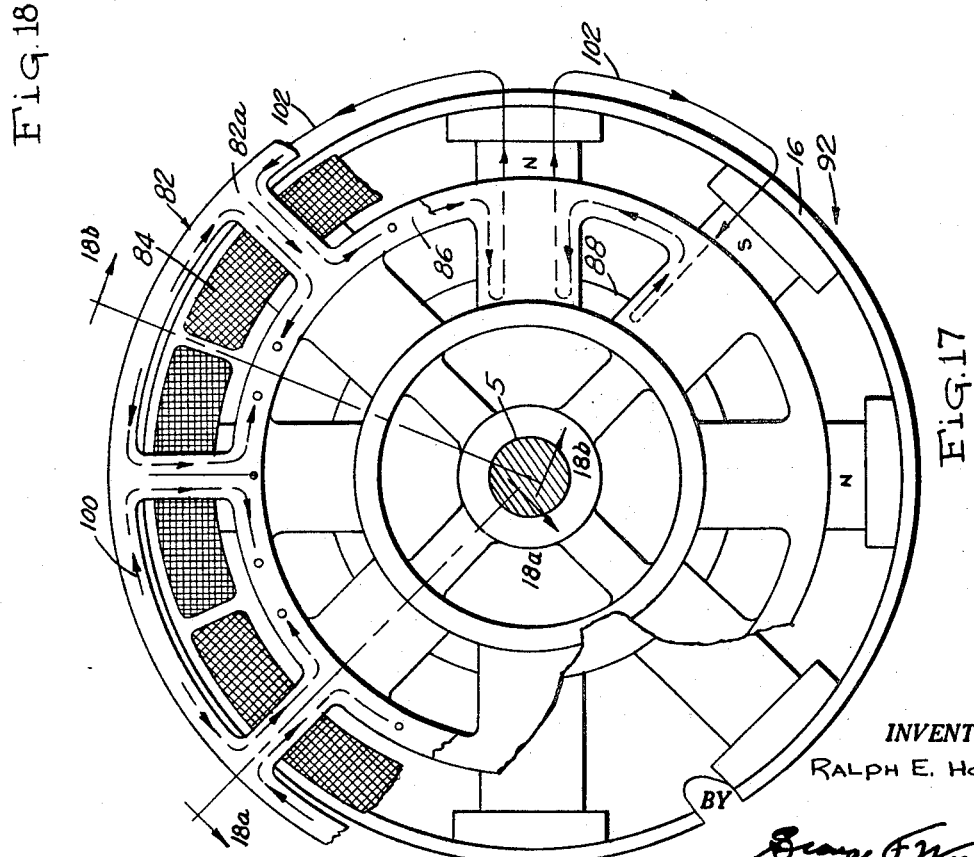

United States Patent Office 3,396,325
Patented Aug. 6, 1968

3,396,325
VOLTAGE CONTROL OF PERMANENT MAGNET GENERATORS
Ralph E. Hopkins, 1006 Chestnut Ave., Falls Church, Va. 22042
Continuation-in-part of application Ser. No. 213,068, July 27, 1962. This application July 21, 1965, Ser. No. 477,349
7 Claims. (Cl. 322—46)

ABSTRACT OF THE DISCLOSURE

This invention is directed to control means for permanent magnet generators whereby the output voltage is substantially linear when subjected to varying operating speeds or to various load conditions. This is accomplished by a nonrotating control winding which will vary the reluctance or permeance of the magnetic path presented to the main magnetic poles of the generator. The control is accomplished by introducing, either vectorially or linearly, a control magnetomotive force in a part of the path of the magnetomotive force of the permanent magnets. An increase in the control force will increase the magnetomotive forces of the permanent magnets which causes the reduction of the output voltage of the generator.

---

This is continuation-in-part of application Ser. No. 213,068, filed July 27, 1962, for "Voltage Control of Permanent Magnet Generators," by Ralph E. Hopkins, now abandoned.

The invention described herein may be manufactured and used by or for the Government of the United States of America for governmental purposes without payment to me of any royalty thereon.

The invention relates generally to the voltage control of the electrical output of permanent magnet generators.

The invention relates more particularly to rotating pole permanent magnet generators, the improvements of which reside in a novel and particularly shaped main spider section for supporting the poles during rotation and a cooperating independent voltage control winding assembly supported on a secondary spider structure which is axially and statically supported substantially independently, externally and axially removed from the rotating generator poles so that the induced flux of the control winding may be combined with the generator flux in the main spider structure for voltage control of the generator output current.

The invention may be applied to a conventional type of generator as illustrated by FIG. 1, p. 2, of the text entitled, "Principles of Alternating Current Machinery," by Lawrence, 3rd edition, published by McGraw-Hill Book Co., Inc., of New York, N.Y. (1940).

It is well known in the generator art that most power devices of the class of this invention require a relatively constant output voltage for satisfactory or even safe operation.

This invention is an improvement over the prior devices for controlling the output of permanent magnet type generators which relied upon the non-linearity of the material used for the MMF path for effectiveness. The prior devices provided a unidirectional magnetomotive force in the main MMF path of the magnets of the generator. This results in addition of the control MMF in half of the polar embraces and in subtraction of the control MMF in the other half of the polar embraces. Except for the nonlinearity of the material used for the main MMF path, the control effect would be self-cancelled. The invention of this disclosure makes use of a spider which isolates the control MMF to a portion of the main MMF whereby windings can be formed thereon and whereby the control MMF is always in an additive relationship with the main MMF.

An object of this invention is to control the generator voltage, by means of a low power supply of A.C. or D.C., said supply being under substantially linear control of a voltage regulating device.

Another object of this invention is to control the generator voltage without the use of any moving parts, brushes and the like.

A further object of this invention is to provide a voltage control in which the net magnetomotive force (MMF) at a section of the spider supporting the rotating poles of the generator is the resultant of the vector addition of the independent magnetomotive forces (MMF's) from a magnet pole of a section of the generator and a corresponding control coil of the control assembly adjacent thereto.

It is another object of this invention that there be no direct correlation between the number of generator poles and the number of control winding coils.

Another object of instant invention is to control the output voltage of a permanent magnet generator, through a static, nonrotating control winding which will vary the reluctance or permeance of the magnetic path presented to the main magnetic poles of the generator.

Another object of instant invention is to provide a voltage control in which the net magnetomotive force (MMF) at a section of the rotating pole spider and a corresponding flux path of the control assembly is the sum of the magnetomotive forces (MMF's) by direct addition of same.

Instant invention provides a voltage control for permanent magnet generators that permits substantially linear operation of the generator at varying speeds.

The exact nature of this invention as well as other objects and advantages thereof will be readily apparent from consideration of the following specification relating to the annexed drawing in which:

FIG. 1 is a partial sectional view taken through the stator, rotor and D.C. energized control winding assembly showing an application of the invention;

FIGS. 2, 3, and 4 show the control winding assembly and flux path through the control winding assembly of FIG. 1, respectively;

FIG. 5 shows a partial view of the generator in elevation having a certain spider construction;

FIG. 6 shows a partial sectional view taken on line 6—6 of the generator spider construction, control windings assembly and axial flux paths as induced by output winding and control assembly windings of FIG. 5;

FIG. 7a shows a vector diagram of the vector sum of the magnetomotive forces (MMF's) of FIG. 5 taken on line 7a;

FIG. 7b shows a vector diagram of the vector sum of the magnetomotive forces (MMF's) of FIG. 5 taken on line 7b;

FIG. 8 is an end view of the generator spider without control winding;

FIG. 9 shows a part section taken on line 9—9 of FIGS. 8 and 10 with an A.C. energized control winding in position as assembled in the device;

FIG. 10 is a view of the control winding and assembly;

FIG. 11 is another view showing the rear of FIG. 10;

FIGS. 12a and 12b are vector diagrams of the summation of the magnetomotive forces;

FIG. 13 is a schematic circuit diagram showing the voltage control means;

FIG. 14 is a perspective view of a modification of the permanent magnet and spider structure of the invention in which the voltage control is obtained by scalar addition of the magnetomotive forces;

FIG. 15 is an end view of the modification shown in FIG. 14;

FIG. 16 is a sectional view taken on the line 16—16 of FIG. 15 showing the structure, with A.C. energized control flux and magnet pole flux paths of the generator;

FIG. 17 is a modification of FIG. 14 and shows the permanent magnet structure, flux path and spider structure;

FIG. 18a is a sectional view taken on the line 18a—18a of FIG. 17 showing a modification of the control winding and support structure, with control flux and magnet flux paths;

FIG. 18b is a sectional view taken on line 18b—18b of FIG. 17;

FIGS. 19 and 20 show developed orientation of the pole heads with various control windings; and FIGS. 21a, b, c and d show various spider configurations.

Briefly, this invention makes use of presenting increased reluctance to the permanent magnets of a permanent magnet generator in order to control and regulate the output voltage thereof. The required output change is accomplished by introducing a control magnetomotive force in a part of the path of the magnetomotive force of the permanent magnets. The control magnetomotive force is added to the main magnetomotive force either in vector or scalar mode. The magnetomotive force supplied by the permanent magnets will increase to supply a higher required magnetomotive force as a result of the introduction of the control magnetomotive force into the flux path of the permanent magnet. In accordance with well known action of permanent magnets incorporated into generators, this magnetomotive force increase will decrease the useful flux and, therefore, reduce the voltage output of the generator. Various modifications are disclosed showing differing ways of presenting the control magnetomotive force to the main magnetomotive force. Since a secondary spider is employed to separate the control structure from the main generating structure, this invention lends itself readily to cryogenic applications. That is, the control winding structure can easily be isolated at cryogenic temperatures while leaving the rest of the structure at the ambient temperature.

FIGS. 1 through 12, inclusive, and FIGS. 17, 18a and 18b, disclose modifications in which voltage control is obtained by the vectorial sum of the magnetomotive forces.

FIGS. 14, 15 and 16 disclose a modification in which voltage control is obtained by the scalar addition of magnetomotive forces.

Similar reference characters refer to similar parts in each of the several views of the drawings.

FIG. 1 discloses a general arrangement in partial section of the invention which includes generator frame 1, stator 2, rotor 3, spider 4, shaft 5, clearance 11, control assembly support means 7, and control winding assembly 8 including control winding 9.

FIG. 2 discloses a left side view of the control assembly 8, having a portion of the control winding 9 in assembled position in control winding assembly 8 together with a flux diagram showing the polarity orientation of the control flux in the iron of control assembly 8 as shown in FIGS. 1 and 5. The flux path is shown through the sectioned winding.

FIG. 3 discloses another configuration of the control assembly 8 looking right to left of FIG. 1 taken about its axis with a portion of control winding 9 in the control assembly 8.

FIG. 4 discloses a sectional view of the control assembly 8 with winding an upper 9 as shown in FIG. 1 and a lower winding 9 to show one-half of the control assembly 8. Also, the polarity of the orientation of the flux lines as appears in a cross section of the control assembly 8 as shown in FIG. 1.

FIGS. 2 and 4 show the placement of the control winding coils 9. It is to be noted that there is no direct correlation between the number of generator poles and the number of control winding coils. The control circuit configuration of FIG. 2 basically represents two poles, each pole having a circular arc of 360 degrees. The number of control winding coils 9 must be chosen in conformance with available mechanical space and flux density in the iron of the control magnetic circuit.

FIG. 5 shows an end view of the generator and pole head assembly 12, stator iron 20 of FIG. 1, less the control assembly 8 of FIG. 6, in which the flux paths A and B are the useful flux flowing from the rotor permanent magnet pole 14, through main spider 10. The crosses and circles are the control winding assembly flux lines flowing in a plane perpendicular to the plane of the drawing.

FIG. 6 discloses in partial sectional view of FIG. 5 taken on line 6—6 showing the relationship of the shaft 5, control winding assembly 8 including secondary spider 8a, support 7 for assembly 8 and control winding 9 with leads 16, generator permanent magnet 14, pole head 12, airgaps 26, main spider 10 and polarity of the orientation of the control flux in spider iron 10a and control assembly iron 8a. Inspection of main permanent magnet flux paths A and B of FIG. 5 and of FIG. 6 show that in the main spider 10 the control flux 22 and main permanent magnet flux 18 are flowing at right angles, irrespective of the direction of flow of the main flux. In FIG. 6, as in FIG. 5, the crosses represent the main flux flowing out of the drawing in a plane perpendicular to the plane of the drawing. The control windings 9 of FIG. 6 are excited by a desired A.C. or D.C. source.

FIG. 7a discloses by a vectorial summation diagram that the main flux of the generator and control flux are flowing at right angles to each other in spider iron 10a in the direction of line 7a—7a of path A of FIG. 5, and that these magnetomotive forces of the fluxes may be added vectorially as shown by the resultant vector of the diagram. At path A of FIG. 5, the main flux is flowing in a counterclockwise direction in the plane of FIG. 5 while the control flux is flowing at right angles out of the plane of FIG. 5.

FIG. 7b, likewise, discloses by vectorial diagram that the main flux and control flux are flowing at right angles to each other in the direction of line 7b—7b of path B in spider iron 10a of FIG. 5 and that these magnetomotive forces of the control flux and main fluxes may be added vectorially and represented by a resultant vector of the diagram. In path B of main spider 10 of FIG. 5 the main flux is flowing in a clockwise direction in the plane of FIG. 5.

Therefore, the resultant MMF at a section of main spider 10 of FIG. 5 is the resultant vector addition of the independent MMF's resulting from the fluxes from the permanent magnet flux 18 and the control flux 22.

FIG. 8 is a partial end view of embodiment of the generator utilizing radial ended magnets as opposed to the flat ended magnets of FIG. 5. Also shown is the direction of rotation of the permanent magnet field poles 26a surrounded partially by shield means 6, of aluminum or other suitable material, which are radially supported on main spider means 28. Polehead 24 of pole 26a is laterally supported by an interspaced web means 30, of aluminum or other suitable material, carried by spider means 28 as indicated in FIGS. 8 and 9. The main output windings 22a and 22b are fixed while the poles 26a are supported on bearings to be rotated. The windings 22a are partially shown as an entrant turn 22b in surrounding fixed stator iron structure 20. The shield means 6 about each pole 26a serve to decrease nondesired transient electromagnet field and current effects present in the generator. Flux paths of the main flux of FIG. 8 are illustrated as flux paths A and B. The flux path of the control flux in spider means 28 is designated by crosses when the flux enters spider means 28 and by dots when the flux leaves spider means 28.

FIG. 9 is an assembled sectional view of the generator and control winding assembly 32 taken substantially at sections 9—9 of FIGS. 8 and 10 and shows the assembly of stator iron 20, main output windings 22a, permanent magnet 26a, pole head 24, interspace web 30, secondary spider means 32a for control winding 38, air gap 32b and flux path in the spider means 28 as produced by control winding assembly 38a. The control winding assembly 32 comprises secondary spider means 32a, windings 38 and support means 38a. It may be seen from FIGS. 8 and 9 that the main flux and control flux paths are at right angles to each other providing vectorially added control flux.

FIG. 10 shows a front view of the separate secondary spider means 32a with control windings 38 in place.

FIG. 11 shows a back view of FIG. 10.

FIG. 12a discloses a resultant vector diagram of the sum of the MMF's of the main flux and control flux when taken on line 12a—12a along path A of FIG. 8.

FIG. 12b discloses a resultant vector diagram of the sum of the MMF's of the main flux and control flux when taken on line 12b—12b at a cross section of path B of FIG. 8, including the control flux path of spider means 28, air gap 32b and secondary spider member 32a of FIG. 9.

FIGS. 12a and 12b vectorially show the combined effect of the magnet MMF and the control MMF across points 12a—12a and 12b—12b of FIG. 8. It can be seen from the vector diagrams that the MMF between the poles is increased and therefore due to the nonlinear nature of the iron the reluctance presented to the pole by spider section 28 of FIG. 8, is increased over that which would be present if no control MMF were applied. It should also be noted that since there is no relative motion between the control MMF and the spider section under the control assembly, no current will be generated in the secondary spider 32a.

FIG. 13 shows a schematic circuit diagram of the control winding 40, permanent magnet field 42 together with generator windings 46 with load terminals 48, 50 and 52 with automatic voltage regulator 46a and voltage rheostat 46b of instant invention.

FIG. 14 is a showing of the invention of this disclosure in perspective. The rotor shaft 5 has supported thereon an auxiliary spider 54 with permanent magnets 14 mounted thereon. It is seen that the control winding assembly 56 is disposed over the continuous section 51 with an air gap 70 of uniform minimum width therebetween. On top of magnets 14 are pole pieces 12 which are separated by an air gap 64a from the stator 20. The spider 54 is constructed in such a manner that the magnetomotive forces from the main stator windings are directed through the permanent magnets 14, spider arms 53, permanent magnets 14, stator 20, permanent magnets 14 adjacent the first mentioned permanent magnet 14, arm 53 connected thereto and continuous section 51. Control winding assembly 56 is provided with windings that produce control flux paths through the continuous section 51 to add directly, that is, in a scalar mode, with the magnetomotive forces from the main stator windings. This would provide for oppositely directed control flux paths discretely located to add with the oppositely directed main flux paths in the continuous section 51. It is readily seen that the main magnetomotive forces have been directed into the path of the control magnetomotive forces so as to give positive control isolated from the stator. This feature enables this invention to be readily adaptable to cryogenic applications in which the control structure can be maintained at cryogenic temperatures while the stator is exposed to temperatures. The boil-off of liquid helium is kept to a minimum by encasing only the control structure to be exposed to the liquid helium. The cryogenic application eliminates the air gap power losses from the system.

FIGS. 14 and 15 show spider 54 and control winding assembly 56 of instant invention in which the voltage control of a generator can be accomplished by controlling the reluctance or permeance of a section of main spider means 54. This can be accomplished by the use of a specially designed spider and a control assembly 56 consisting of a laminated structure such as a motor stator, so wound as to have the same number of poles as the main rotor.

FIG. 15 shows the rotor 74 consisting of a permanent magnet pole structure 14, special main spider structure 54. The control assembly 56 is supported to completely encircle the main spider means 54. The main flux flow 18 will flow down a permanent magnet pole 14 toward the center of the generator and then axially along the spider 54 as shown in FIG. 16. This is a common path with control flux 56f. The flux then must flow in a circumferential out of the plane of FIG. 16 until it reaches spider means 54 under the adjacent pole. Then the flux must again flow axially from right to left as in FIG. 16 until it reaches another permanent magnet pole 14, upward through the pole, across the air gap 64a and through the stator iron 20, to complete the magnetic flux path. Spider means 54 is of a unique design to closely control the flux path of the generator.

FIG. 16 is a sectional view of FIG. 15 taken at section 16—16 showing the structural detail of main spider means 54, permanent magnet pole 14, pole shield means 6, interspace web 60a between poles, stator 20, control winding assembly 56, including winding 56a, core means 56b and support means 56c, non-magnetic main spider support 68, shaft 5, air gaps 64a and 70. The flux paths of main flux 18 from stator 20 and flux path 56f of the control flux may be added directly or by scalar addition. Interspace web 60a and main spider support 68 may be of aluminum or other desired non-magnetic material.

If the control assembly 56 of FIG. 16 is wound with a polyphase winding so as to produce the same number of poles as the main rotor 74 when supplied with an alternating polyphase potential, control will be achieved in the following manner. When so supplied, the flux paths of the control flux will be as shown in FIG. 15 and the poles producing this flux will rotate in synchronism with the rotor 74, if of the same frequency. Since there will be no relative motion between the poles produced by the control assembly and the main rotor assembly, the section of the spider under said control assembly may have its reluctance or permeance altered by the presence of the control flux. It will be noted that the control flux and the main magnet flux are in direct addition in the spider section under the control assembly, irrespective of the direction of the main flux paths. Since there is no relative motion between the control MMF and the spider sections under the control assembly, no current will be generated in the spider. However, if for some reason a disturbance to the rotary motion appears, the control assembly will generate damping currents in the spider and produce a heavy damping action tending to cause the harmful motion to die out.

FIG. 17 illustrates another modification of the main spider structure 86 supported by annulus support member 88 on shaft of the generator juxtaposed to control winding assembly 82 of the invention having various portions cut away. Control winding assembly 82 includes plural windings 84 wound on each opposite leg of each U-shaped cross section secondary spider core structure 82a, see FIG. 18a. Control assembly 82 occupies 360 degrees about shaft 5 as illustrated at the top of FIG. 17 as a partial view. The flux path of the main spider structure 86, permanent magnet pole 14, pole head 12 and stator 92 may be represented by flux path 102, and the flux path of the control winding assembly 82 is designated as path 100 in core or supporting iron structure 82a as shown in FIGS. 18a and 18b.

FIG. 18a illustrates a part sectional view of the device taken on line 18a—18a of FIG. 17, showing the control flux path 83 in core structure 82a of assembly 82 including plural control windings 84. Flux path 102 represents the flux path of the generator through stator 92, pole head 12, permanent magnet pole 14 surrounded by shield means 6 and main spider structure 86. The resultant magnetomotive force (MMF) of the flux path 102 and the control flux path 83 at a section of extending main spider annulus section 86a is their vector sum by 90° vector addition.

FIG. 18b likewise illustrates a part sectional view of the invention taken on line 18b—18b of FIG. 17 as indicated by arrows. Shaft 5 supports by members 88, main spidered structure 86 having an extending main spider annulus section 86a and interspace web means 96 between permanent magnet poles 14. Control winding assembly 82 consists of secondary spider core structure 82a of a U-shape as shown with opening pointed radially toward the axis of shaft 5 and has plural control windings 84 as illustrated which are supported by support means 80 juxtaposed by air gaps 90 to extending main spider annulus section 86a of main spider 86, as also illustrated by FIG. 18a.

Referring to FIGS. 18a and 18b, the control assembly 82 containing plural control windings 84 and secondary spider structure 82a is supported by dotted means 80 which may be varied, as desired, without departing from the spirit and scope of the invention. Support member 88 supports main spider 86 on shaft 5 and is preferably composed of nonmagnetic material to restrict path of flux 102. Control winding assembly 82 surrounds generator spider means 86 in spaced relationship by air gaps 90. Interspace web members 96 between poles 14 are preferably manufactured from aluminum or other suitable material to obtain a unique control of the flux path through poles 14.

FIG. 19 shows a developed view of the orientation of the permanent magnet poles 110 and flux paths of the flux in the various types of spider sections.

FIG. 20 is similarly, a developed view of an alternative type of control winding 130 in a control assembly 133 and spider irons 115. Illustration of control winding 130 being employed with spider iron 115 is shown extending main spider annulus section 86a of main spider structure 86 in FIG. 18.

FIGS. 21a, 21b, 21c and 21d represent some various spider sections that may be employed in the spider irons of FIG. 19. It is to be understood that the main spider section is not necessarily restricted to the illustrated cross sections of the drawings but may be varied by one skilled in the art without departing from the intent and scope of the invention.

The operation of the improved control means of this invention can be readily understood by reference to FIG. 1. By the use of the spider 4, the MMF from the main magnets of the generator is routed to be isolated in the vicinity of the MMF produced by the control 8. The individual MMF sources in control 8 produce a MMF which covers one pole embrace. The control winding 9 is connected as shown in FIG. 13. The phasing of the control voltage is locked so as to always produce an additive MMF to the main magnet flux presented thereto. With this synchronization, adjacent control windings are presenting opposite directed MMF paths which alternate in response to the alternations of the main magnet MMF path. With the main magnet MMF path isolated so as to be exposed to the control MMF paths in this manner, a full time additive control is constantly presented. With this improved control, the magnetic linearity of the materials used is of no consequence. The species shown in FIGS. 6 and 10 are constructed so as to give vector addition of the control MMF's to the main magnets MMF's.

The species shown in FIGS. 14 through 16 and 17 provide for scalar addition of the control and main magnet MMF's.

In FIG. 14, the three dimensional presentation shows that an MMF path from the main magnet MMF, for example, circumferentially through the main magnets along a path 18, across an air gap 64a, into a pole piece 12, permanent magnet 14 to arm 53 which is perpendicular to the path through permanent magnet 13 and parallel to the axis of the rotor shaft 5. The MMF flows through spider arm 53 into arcuate continuous section 51, which is in fact, a wheel configuration. From this arcuate portion the MMF flows back through the next adjacent spider arm 53 outwardly through a second permanent magnet 14, a second pole piece 12, a second air gap 64a, back into the main magnet along path 18. Since the windings in the control winding assembly 56 produces control MMF paths that add directly, scalarly, with the MMF's from the main stator windings, the control operates to provide constantly additional MMF, never a subtracted amount, to provide the required MMF saturation to reduce the output voltage when the output tends to be more than the controlled limit.

It is to be noted that this invention includes the important teaching that control MMF's are applied perpendicularly or from any other angle in three dimensional space to provide vectorially added control to the MMF's from the main magnets of the generator. This is manifested by the application of the control MMF's across a very narrow air gap to the main MMF's passing through a spider structure, not by windings on the spider.

So it is seen that I have provided a new and useful control means for permanent magnet generators. With the magnetomotive forces from the permanent magnets being directed into a path that is common with the applied control magnetomotive forces, the increase in reluctance in the magnetomotive forces in the generator produced by the increase in the control magnetomotive forces results in decrease of the output voltage of the generator.

In cryogenic applications, the isolation of the control mechanism and the spider that provides the common path for the permanent magnet magnetomotive forces and the control magnetomotive forces practically eliminates power losses therein. The electrical efficiency of such a generator would be considerably increased.

It is another object of this invention to provide a permanent magnet generator which is readily adaptable to cryogenic applications.

It is to be further understood that the instant voltage control for permanent magnet generators is illustrative of the principles of this invention and that numerous arrangements may be devised by those skilled in the art without departing from the spirit and scope of the invention as set forth in this specification and in the claims.

What is claimed is:

1. In a permanent magnet generator means;
   a stator having load windings thereon,
   generator load terminals connected to said load windings,
   an armature,
   a rotor mounted on said armature,
   a plurality of permanent magnet pole pieces mounted on said rotor,
   said pole pieces polarized to provide a plurality of polar embraces,
   a spider means connected to said rotor and coaxial therewith to provide a path for the main magnetomotive forces in said polar embraces,
   a magnetomotive path means mounted so as to be in a fixed position with respect to said stator,
   said path means separated from said spider means by a minimal air gap,
   control windings on said path means to provide control magnetomotive forces perpendicularly to said spider means across said air gap, and
   circuit means connected to said generator load terminals and to said control windings to synchronize the control magnetomotive forces to be additive with the main magnetomotive forces in said spider means for every polar embrace.

2. The permanent magnet generator means of claim 1 in which
   said spider means is connected coaxially to said rotor means,
   and said path means is coaxially mounted with respect to said spider means and having a diameter substantially equal to the diameter of said spider means.

3. The permanent magnet generator means of claim 1 in which
said spider means mounted intermediate said rotor and said armature.

4. The permanent magnet generator means of claim 1 in which
said rotor includes spaced arm means extending from the periphery of said spider means in a direction parallel to the axis of said armature,
said pole pieces mounted on said arms and radially aligned with respect to said armature, and
said magnetomotive path means surrounding said spider means.

5. The permanent magnet generator means of claim 1 in which
said spider means includes a flange means offset from said rotor, and
said path means being of C-shaped cross-section and located to receive said flange means in the opening of said C separated therefrom by a pair of minimal air gaps.

6. The permanent magnet generator means of claim 1 in which
said control magnetomotive forces are added to said main magnetomotive forces in a scalar manner.

7. The permanent magnet generator means of claim 1 in which
said control magnetomotive forces are added to said main magnetomotive forces in a vector manner.

References Cited

UNITED STATES PATENTS

| | | | |
|---|---|---|---|
| 2,564,320 | 8/1951 | Brainard | 322—57 X |
| 3,017,562 | 1/1962 | Duane | 322—46 |
| 3,214,675 | 10/1965 | Foster | 310—156 X |

FOREIGN PATENTS 894,161   4/1962   Great Britain.

ORIS L. RADER, *Primary Examiner.*

H. HUBERFELD, *Assistant Examiner.*